United States Patent
King, Jr.

(10) Patent No.: US 11,105,530 B2
(45) Date of Patent: *Aug. 31, 2021

(54) PASSIVE DUCTWORK INTUMESCENT FIRE DAMPER

(71) Applicant: Superposed Associates LLC, North Kingstown, RI (US)

(72) Inventor: Jack F. King, Jr., North Kingstown, RI (US)

(73) Assignee: Superposed Associates LLC, North Kingstown, RI (US)

(*) Notice: Subject to any disclaimer, the term of this patent is extended or adjusted under 35 U.S.C. 154(b) by 302 days.

This patent is subject to a terminal disclaimer.

(21) Appl. No.: 16/401,442

(22) Filed: May 2, 2019

(65) Prior Publication Data

US 2019/0257548 A1    Aug. 22, 2019

Related U.S. Application Data

(63) Continuation of application No. 15/160,267, filed on May 20, 2016, now Pat. No. 10,323,856.

(60) Provisional application No. 62/165,630, filed on May 22, 2015.

(51) Int. Cl.
| | |
|---|---|
| *A62C 2/06* | (2006.01) |
| *F24F 13/08* | (2006.01) |
| *F16L 5/04* | (2006.01) |
| *F24F 11/35* | (2018.01) |
| *A62C 3/16* | (2006.01) |

(52) U.S. Cl.
CPC .............. *F24F 13/08* (2013.01); *A62C 2/065* (2013.01); *F16L 5/04* (2013.01); *F24F 11/35* (2018.01); *A62C 3/16* (2013.01); *F24F 2221/30* (2013.01)

(58) Field of Classification Search
CPC .... F24F 13/08; F24F 13/0263; F24F 2221/30; F16L 5/04; A62C 3/16; A62C 2/0065; A62C 2/065
USPC ........................................................ 454/369
See application file for complete search history.

(56) References Cited

U.S. PATENT DOCUMENTS

| | | | |
|---|---|---|---|
| 4,136,707 A | 1/1979 | Gaillot et al. | |
| 4,559,745 A | 12/1985 | Wexler | |
| 4,796,401 A | 1/1989 | Wexler | |
| 4,848,043 A | 7/1989 | Harbeke | |
| 4,882,886 A | 11/1989 | Harbeke | |
| 4,894,966 A | 1/1990 | Bailey et al. | |
| 4,901,488 A | 2/1990 | Murota et al. | |
| 4,951,442 A | 8/1990 | Harbeke, Jr. | |
| 5,129,201 A | 7/1992 | Robertson et al. | |
| 5,155,957 A | 10/1992 | Robertson et al. | |
| 5,309,688 A | 5/1994 | Robertson | |
| 5,345,677 A | 9/1994 | Cook | |
| 5,347,767 A | 9/1994 | Roth | |
| 5,421,127 A | 6/1995 | Stefely | |
| 5,452,551 A | 9/1995 | Charland et al. | |
| 5,456,050 A | 10/1995 | Ward | |

(Continued)

FOREIGN PATENT DOCUMENTS

| | | |
|---|---|---|
| DE | 29712909 U1 | 10/1997 |
| DE | 19956066 A1 | 8/2000 |

(Continued)

*Primary Examiner* — Kenneth J Hansen
*Assistant Examiner* — Ryan L Faulkner
(74) *Attorney, Agent, or Firm* — Breiner & Breiner, L.L.C.

(57) ABSTRACT

There is disclosed a passive intumescent fire damper having a metal housing, an inner meltable liner and having a metal and intumescent laminate assembly surrounding the inner liner.

8 Claims, 7 Drawing Sheets

(56) References Cited

U.S. PATENT DOCUMENTS

| | | |
|---|---|---|
| 5,634,304 A | 6/1997 | Sakno |
| 5,876,042 A | 3/1999 | Graf et al. |
| 5,887,395 A | 3/1999 | Navarro et al. |
| 5,953,872 A | 9/1999 | MacMillian et al. |
| 5,970,670 A | 10/1999 | Hoffman |
| 6,029,412 A | 2/2000 | Gohlke |
| 6,112,488 A | 9/2000 | Olson et al. |
| 6,161,873 A | 12/2000 | Munzenberger et al. |
| 6,176,052 B1 | 1/2001 | Takahashi |
| 6,360,502 B1 | 3/2002 | Stahl, Jr. |
| 6,405,502 B1 | 6/2002 | Cornwall |
| 6,426,463 B2 | 7/2002 | Munzenberger et al. |
| 6,615,860 B2 | 9/2003 | Didone et al. |
| 6,694,684 B2 | 2/2004 | Radke et al. |
| 6,725,615 B1 | 4/2004 | Porter |
| 7,080,486 B2 | 7/2006 | Radke et al. |
| 7,596,914 B2 | 10/2009 | Stahl, Sr. et al. |
| 7,642,461 B2 | 1/2010 | Klein et al. |
| 7,784,221 B2 | 8/2010 | Truss |
| 7,877,941 B2 | 2/2011 | Fischer et al. |
| 7,913,468 B2 | 3/2011 | Spais |
| 8,029,345 B2 | 10/2011 | Messmer et al. |
| 8,178,781 B2 | 5/2012 | Duffy |
| 8,188,382 B2 | 5/2012 | Monden et al. |
| 8,689,504 B2 | 4/2014 | Monden et al. |
| 2004/0211138 A1 | 10/2004 | Sakno |
| 2005/0150677 A1 | 7/2005 | Hochstim et al. |
| 2006/0096207 A1 | 5/2006 | Spais |
| 2007/0257487 A1 | 11/2007 | Jacklich et al. |
| 2009/0255619 A1 | 10/2009 | Tong |
| 2012/0186684 A1 | 7/2012 | Giovannetti et al. |
| 2013/0091789 A1 | 4/2013 | Simon et al. |
| 2014/0007373 A1 | 1/2014 | Muenzenberger |
| 2014/0077043 A1 | 3/2014 | Foerg |
| 2014/0082956 A1 | 3/2014 | Sullivan |
| 2014/0260016 A1 | 9/2014 | Langille et al. |
| 2015/0121782 A1 | 5/2015 | McConnell et al. |
| 2015/0121783 A1 | 5/2015 | McConnell et al. |
| 2015/0204087 A1 | 7/2015 | Muenzenberger |

FOREIGN PATENT DOCUMENTS

| | | |
|---|---|---|
| DE | 202004004605 U1 | 8/2004 |
| DE | 102006026190 A1 | 11/2007 |
| DE | 102012216562 A1 | 10/2013 |
| EP | 0890372 A2 | 1/1999 |
| EP | 2239014 A1 | 10/2010 |
| EP | 2412409 A1 | 7/2011 |
| FR | 2363673 A1 | 3/1978 |
| FR | 2370139 A2 | 6/1978 |
| GB | 2419385 B | 1/2010 |
| WO | 9918303 A1 | 4/1999 |
| WO | 2007068787 A1 | 6/2007 |
| WO | 2008056029 A1 | 5/2008 |
| WO | 2010112851 A2 | 10/2010 |

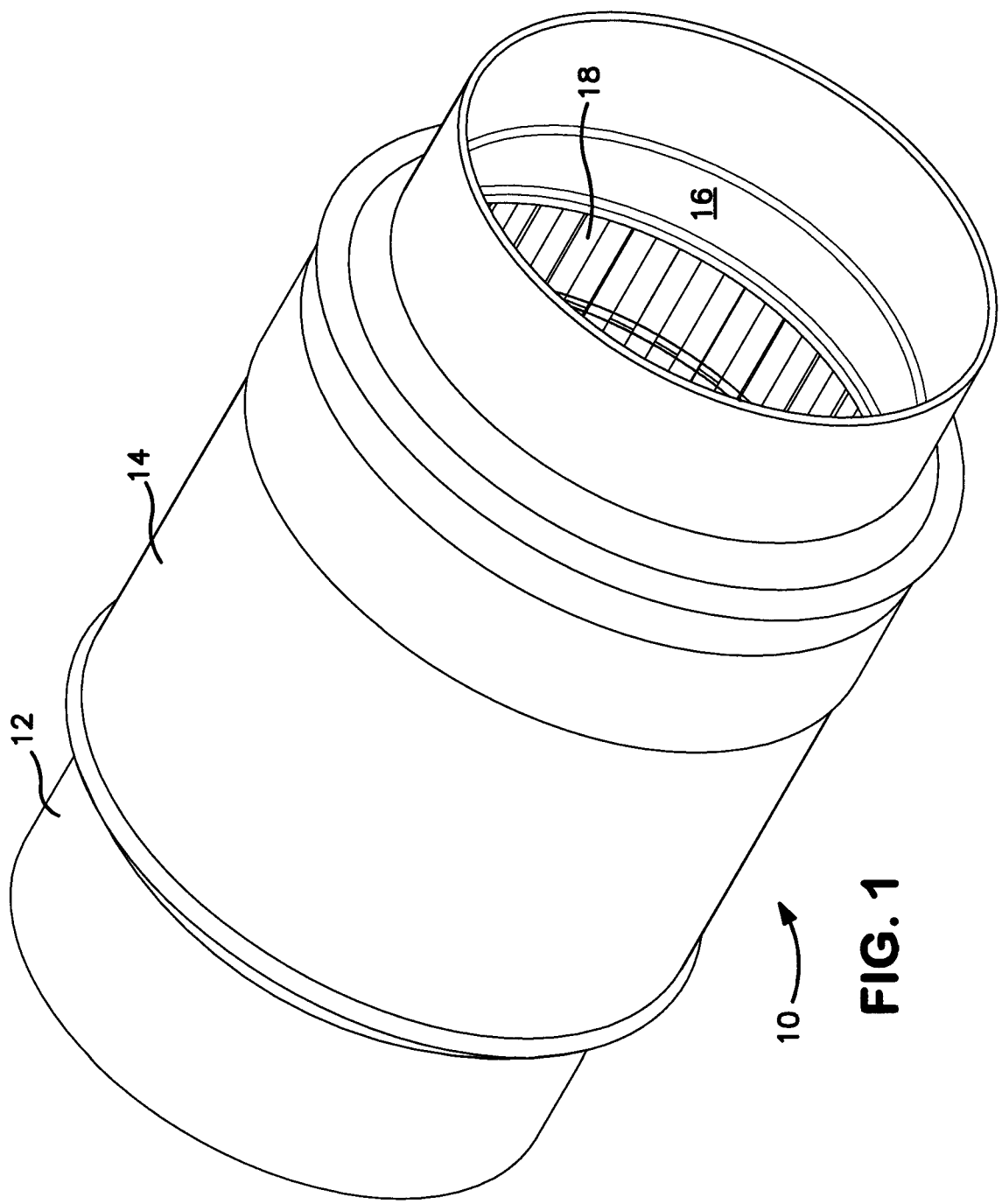

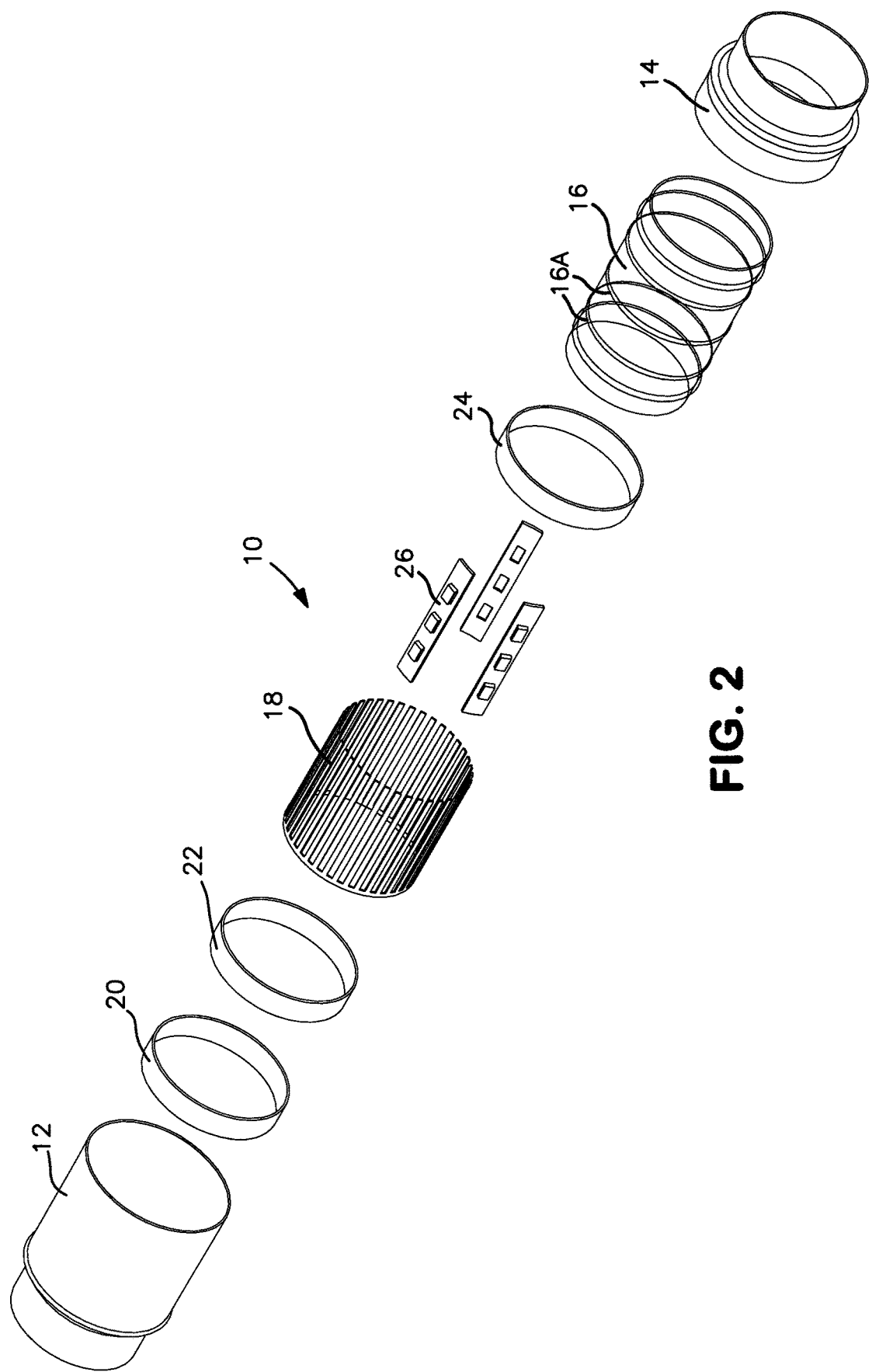

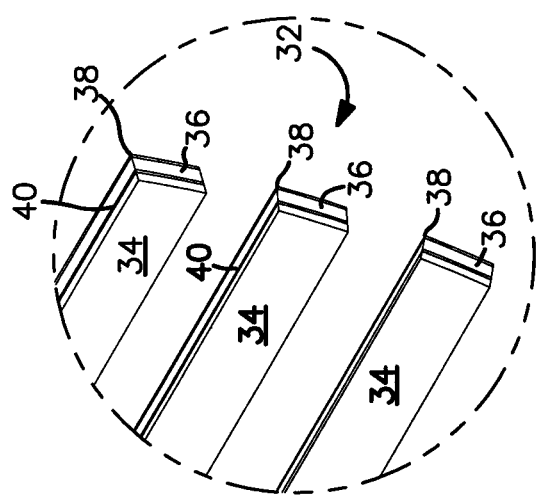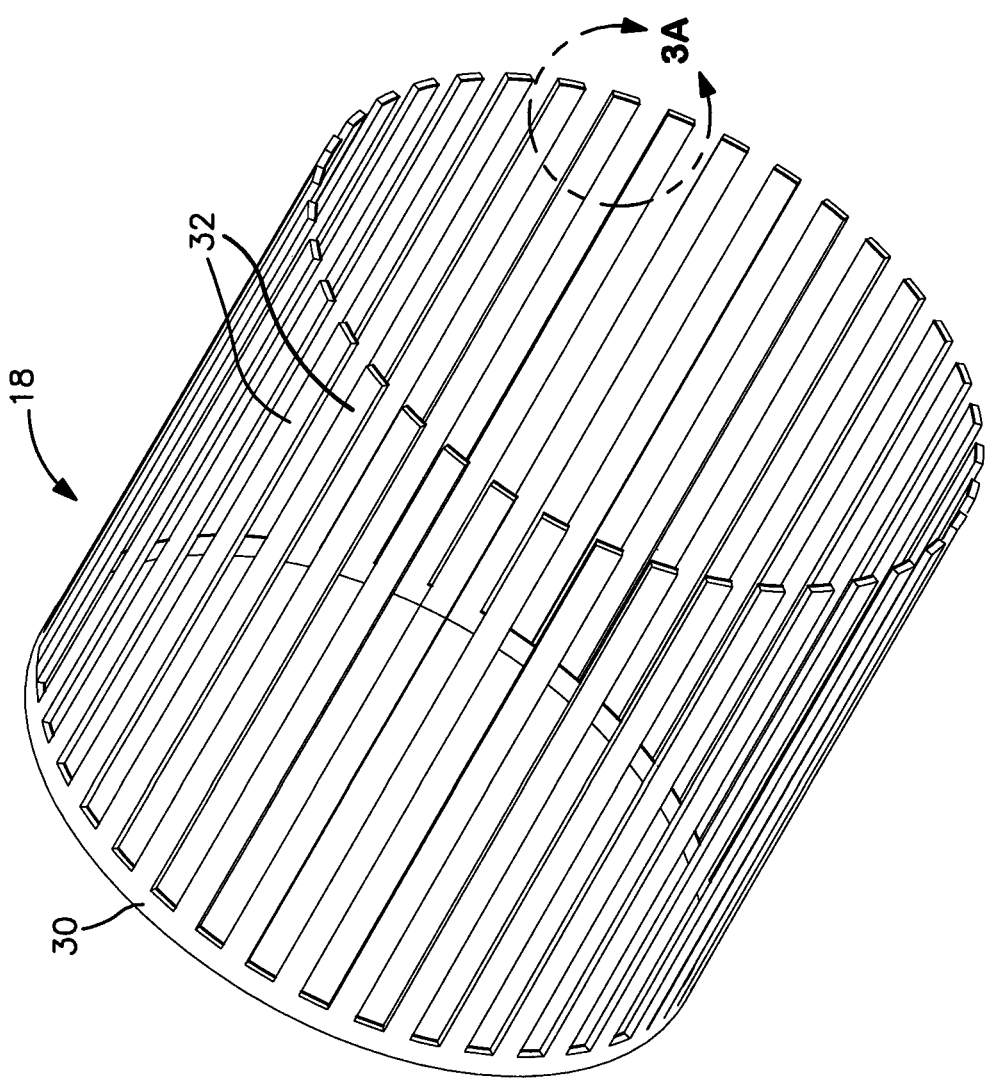

PASSIVE DUCTWORK INTUMESCENT FIRE DAMPER

RELATED APPLICATION

This application claims benefit of U.S. patent application Ser. No. 15/160,267, filed May 20, 2016, entitled "Passive Ductwork Intumescent Fire Damper," which claims benefit of U.S. Provisional Application Ser. No. 62/165,630, filed May 22, 2015, entitled "Passive Ductwork Intumescent Fire Damper," and each of which being incorporated herein by reference in its entirety.

FIELD OF THE INVENTION

The present invention relates to a passive ductwork intumescent fire damper. More particularly, the invention relates to a fire damper for use in small ductwork and not requiring an access means to the fire damper.

BACKGROUND OF THE INVENTION

Fire dampers are known in the art. For example, fire dampers and ceiling radiation dampers (collectively and broadly referred herein to as "fire damper") which are "dynamic" and "standard" are known and require periodic testing according to some code requirements to ensure their proper operation. In some applications, these dampers cannot be used due to products or byproducts in the air stream which will cause build up and create a hazard of blockage or possibly negatively impair the proper operation of the damper. When these fire dampers are concealed within a fire rated assembly, access is required to the damper requiring a fire rated access door. Such dampers are usually not suitable for use in small ductwork including kitchen exhaust, dryer exhaust, bathroom ventilation and any other ductwork which may require material collection such as in a shop having substantial dust of material build up.

Additionally, fire dampers using a fusible link are known in the art. For example, Aire Technologies Inc. makes a fire damper "Series 65 Type B Static Fire Damper" which includes a rectangular frame having a top enclosure having blades riveted to the frame and held in place by a fusible link which will release the blades to cut off circulation in the duct upon reaching a certain temperature. Such devices while useful for certain applications are complex, expensive and do not readily lend themselves to use in ductwork of smaller applications such as a kitchen exhaust, dryer exhaust or the like.

Additionally, fire dampers using an intumescent are known in the art. However, these fire dampers are complex and expensive to manufacture and/or do not comprise an out-of-air stream fire damper.

These devices while useful in certain situations have various shortcomings including their complex nature, their expense to manufacture and their inability to work well in small ductwork or ventilation systems. These and other shortcomings of such devices are addressed by the present invention.

SUMMARY OF THE INVENTION

A primary object of the present invention is to provide a passive intumescent fire damper with a simple and flexible design and useful in small ductwork and ventilation applications.

Another primary object of the present invention is to provide a passive intumescent fire damper which precludes the need for an access door.

Another primary object of the present invention is to provide a fire damper having a substantially smooth duct interior such that no obstructions may build up in the duct, sometimes referred to as an "out-of-air stream" damper because there is no obstruction in the air stream of the damper as opposed to fire dampers having a fire damper component in the air stream, e.g. a spring loaded shutter with a fusible link.

Another primary object of the present invention is to provide a passive ductwork intumescent fire damper simple in construction, inexpensive and easy to install and use.

The passive ductwork intumescent fire damper invention comprises a metal ductwork housing; interspersed in the ductwork housing is a liner of plastic or other material which will melt at a certain temperature; a metal and intumescent laminate assembly surrounding the liner; and heat shrink bands surrounding the laminate assembly. This fire damper is encased in a sheet metal ductwork fitting. When the fire damper is exposed to heat, the liner will melt. The heat shrink tubing is then exposed to heat and as it shrinks it pulls the metal of the laminate assembly in radially, thereby creating a cone shape (in a round fire damper). The intumescent material is then exposed to the inside of the ductwork and when exposed to the heat will expand and close off the duct passage. The metal of the laminate assembly accelerates this process by conduction and ensures that the intumescent continues expansion. The invention is particularly useful in smaller ductwork such as kitchen, dryer and bathroom ductwork and venting.

The passive ductwork intumescent fire damper invention further includes in some embodiments a plastic injection molded liner having a unique profile for round, oval or rectangular applications. The liner allows the intumescent to be encased completely out of the air stream. This allows for maximum free area and very low friction loss through the device.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1 is a side perspective view of the assembled fire damper of the present invention.

FIG. 2 is an exploded view of the fire damper components of FIG. 1.

FIG. 3 is a side view of the metal and intumescent laminate assembly of the fire damper of FIG. 1.

FIG. 3A is an enlarged view taken at 3A of FIG. 3 showing the metal and intumescent laminate assembly.

DETAILED DESCRIPTION OF THE PREFERRED EMBODIMENTS

Figure 4:
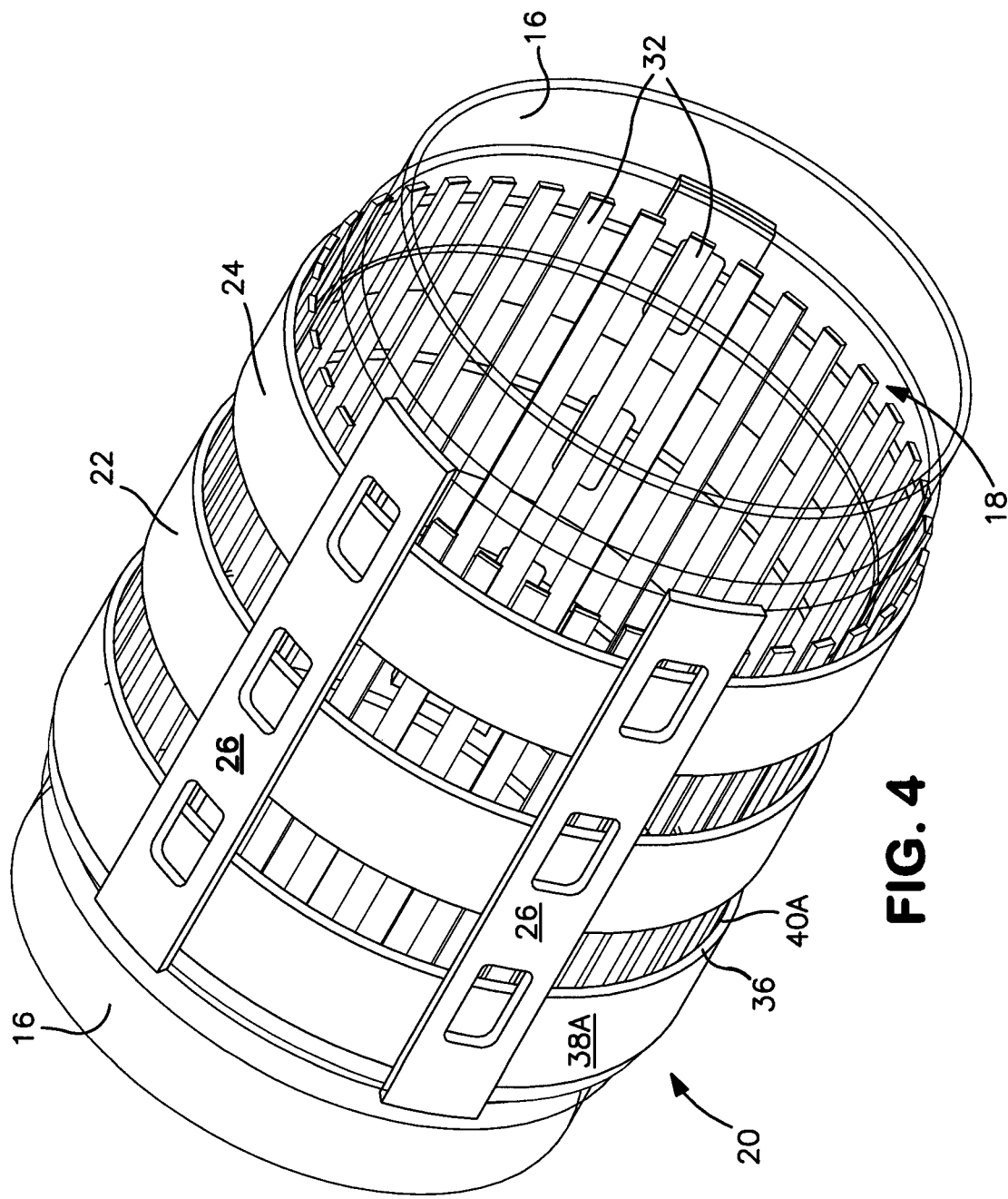
FIG. 4 is a side view of the metal and intumescent laminate assembly in place over the plastic liner with a lower intumescent band and upper heat shrink bands encircling the outermost circumference of the assembly.

The passive ductwork intumescent fire damper invention is illustrated in FIGS. 1-8. As best seen, for example, in FIG. 2, a fire damper 10 comprises a housing of a male metal duct member 12 and a female metal duct member 14; an inner liner 16; a metal and intumescent laminate assembly 18; an intumescent band 20; heat shrink bands 22 and 24; and clips 26. The housing shown for purposes of illustration of the invention is round. However, it is understood that the invention is useful with other shape fire dampers including, but not limited to, rectangular and oval fire dampers. It is further understood that the other components of the fire damper may vary in shape depending upon the housing shape.

Referring, for example, to FIGS. 1 and 2, the fire damper 10 includes a metal housing. In one preferred embodiment, the metal housing includes sheet metal male duct member 12 and sheet metal female member 14. This provides for a housing for the fire damper components and may be placed in relation to a vent and duct work as shown, for example, in FIGS. 5 and 6 and discussed further below.

The fire damper 10 includes a liner 16 preferably made of polyethylene terephthalate (PET), high density polyethylene (HDPE) or other suitable plastics or other meltable materials such as, for example, a fusible alloy. The plastic material is selected to melt at a certain temperature depending on the fire damper's intended use to expose the intumescent material of the metal and intumescent laminate assembly 18, the intumescent band 20 and the heat shrink bands 22 and 24. The liner 16 may, in one preferred embodiment, be transparent. It also may include outwardly extending ribs 16A which may be useful in securing the metal and intumescent laminate assembly 18 to the liner as discussed below.

Referring to FIG. 3, there is shown the metal and intumescent laminate assembly 18. The assembly includes a bottom portion 30 having extending therefrom a plurality of strips 32. The bottom portion 30 is closest to the vent to which the fire damper is connected. Strips 32 are in a preferred embodiment a laminate assembly having an inner layer of metal 34 and an outside layer of intumescent 36, the intumescent having an outer plastic protective face 38 and inner plastic protective face 40. The preferred metal is copper and the intumescent is preferably glued or otherwise adhered to the copper. It is understood that other metals may be used without departing from the scope of the invention. For ease, the preferred metal of copper will be used in describing the invention.

The intumescent band 20 is a solid band of intumescent material 36 having the similar outer plastic protective face 38A and inner plastic protective face 40A. The intumescent band 20 when exposed to heat will cause the intumescent to expand to enclose the air stream in conjunction with the metal and intumescent laminate assembly 18. A presently preferred intumescent material for the intumescent band and the intumescent strips is STI SpecSeal Wrap Strip made by Specified Technologies Inc.

Heat shrink bands 22 and 24 are made of a rubber material such as a 3M HDT belt and will shrink when exposed to heat.

Referring to FIG. 4, there is shown the fire damper assembly as it will be fitted into the metal housing 12 and 14. The inner material is the plastic liner 16. Around the plastic liner 16 is the copper and intumescent laminate assembly 18. Support clips 26, preferably made of a plastic such as PET, may be used to secure the intumescent band 20 and heat shrink bands 22 and 24 to the clip members 26. This assembly is inserted into metal member 12 and the assembly is closed by metal member 14.

Figure 5:
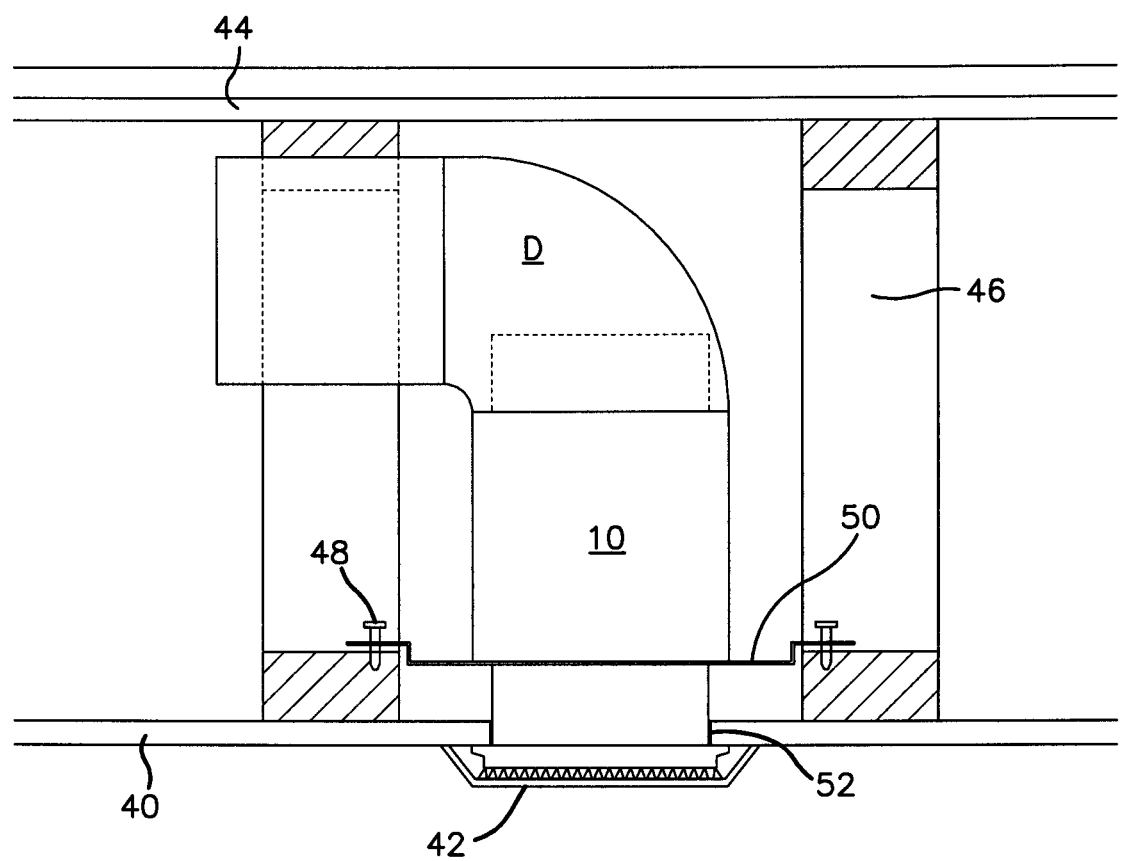
FIG. 5 is a cross-sectional view of an example of use of the passive duct work intumescent fire damper of the invention in relation to a ceiling vent.
Figure 6:
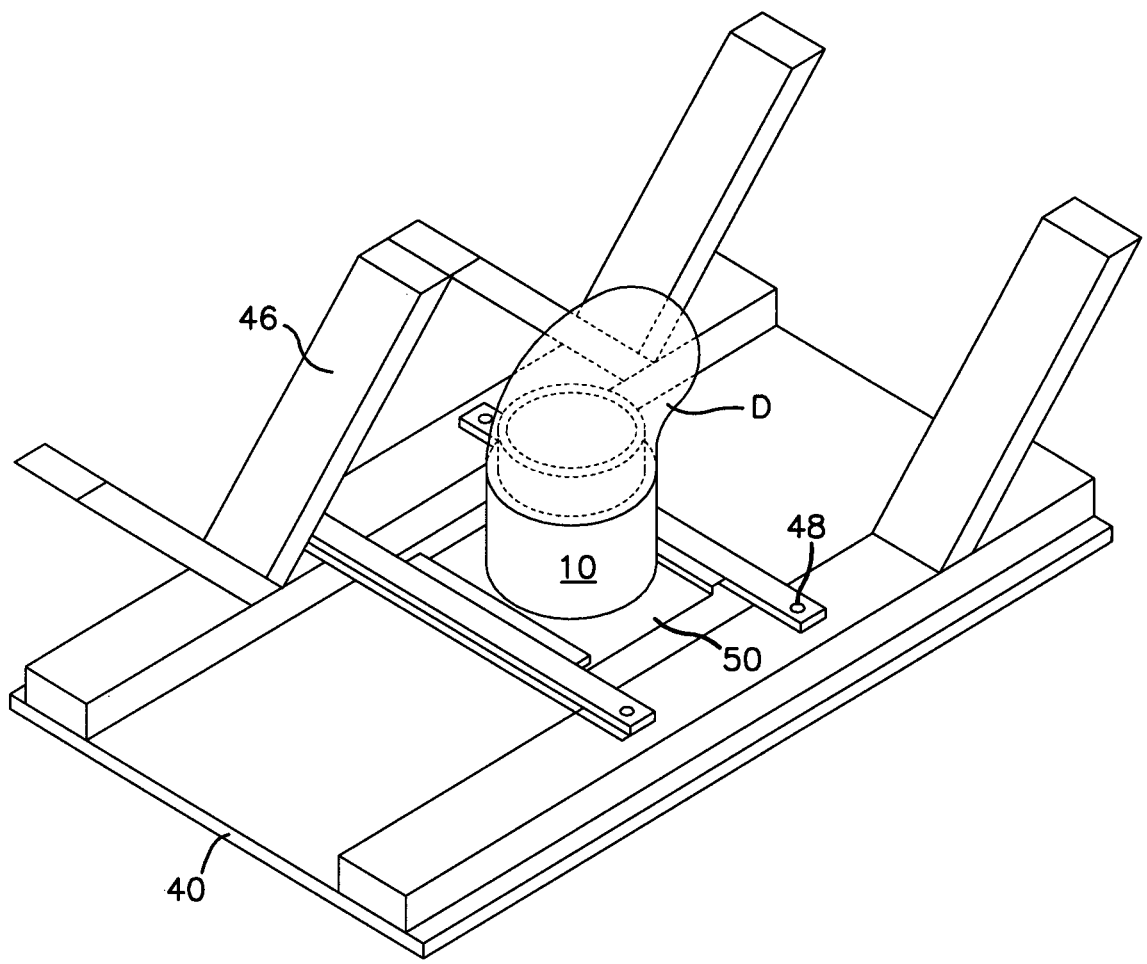
FIG. 6 is a perspective view similar to FIG. 5.

Referring to FIGS. 5 and 6, there is shown an example of the fire damper 10 installed to a duct D in a home above a ceiling 40 of gypsum wallboard and above a mounted steal grille, diffuser or duct drop 42. In this example, there is a floor or roof decking 44; floor or ceiling tresses 46; truss fasteners 48 such as nails or screws; a 22 gauge "S" slip 50 for mounting the fire damper 10; and an intumescent fire caulk seam 52 as required.

An example of use of the passive ductwork intumescent fire damper is shown at FIGS. 5-8. In this example, the fire damper 10 is mounted in the ceiling and attached to a metal duct D. In the event of a fire, the liner 16 will melt exposing the copper and intumescent laminate assembly 18, the intumescent band 20 and the heat shrink bands 22 and 24 to the heat. Without being bound to theory, several things will then occur substantially simultaneously. The copper and intumescent laminate assembly 18 will begin to heat rapidly both from the airflow and conduction through the copper. The heat shrink bands 22 and 24 begin to constrict thereby radially deflecting the copper and intumescent laminate assembly 18 into a cone shape (the shape will differ in other shape fire dampers). This has the desired effect of partially blocking the duct and accelerating the intumescent's expansion by trapping the heat into the base of the intumescent thereby continuing the expansion of char. The copper conducts the heat into the center of the char ensuring expansion. The copper and intumescent laminate assembly by virtue of the multiple small isolated strips heats faster and exposes significantly more surface area of intumescent for char formation. Additionally, the intumescent band 20 upon heating expands the intumescent, further closing the duct to the fire. This is an improvement over conventional wrap and putties which have more thermal mass and limited surface area as the outermost wrap shields the layers behind it and which absorb heat and slows expansion.

Figure 7:
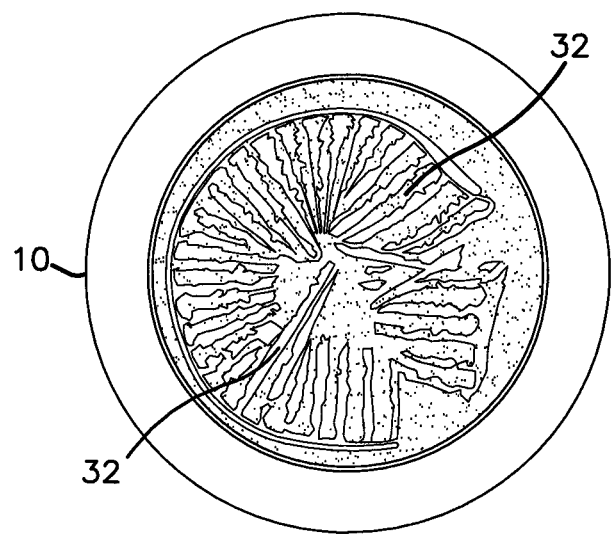
FIG. 7 illustrates the fire damper of the invention after being exposed to a fire and showing the side which faced the heat source.
Figure 8:
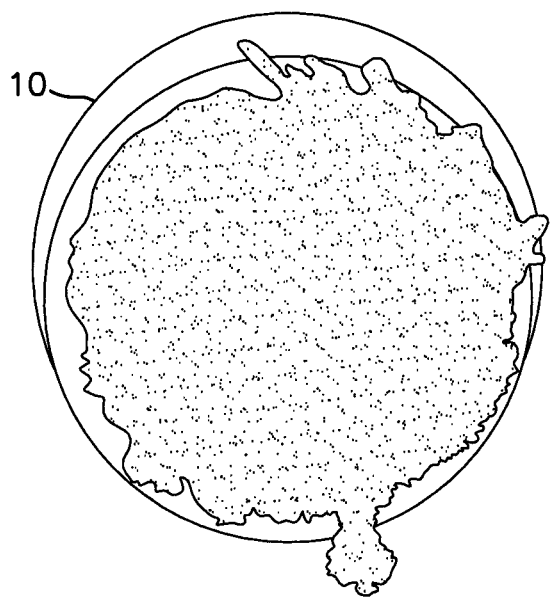
FIG. 8 illustrates the fire damper of the invention after being exposed to a fire and showing the expanded intumescent side away from the heat source.

Referring to FIGS. 7 and 8, there is shown the fire damper invention after being exposed to a fire. FIG. 7 shows the fire damper from the side which faced the heat source. The copper strips 32 are shown as contracted and surrounded by intumescent. FIG. 8 shows the fire damper from the side away from the heat source and shows the intumescent char as expanded and the closing off of the air stream and preventing the spread of the fire.

The present invention is simple in structure and use; is less expensive to manufacture than the more complex devices on the market; is useful in smaller applications such as kitchen hoods, laundry dryer venting, and bathroom fixtures having a combination fan and light; and similar ductwork or venting. The open and smooth airstream precludes material built up and allows for superior air flow. The simple structure allows for ease of installation and use. The lack of fusible links, springs or tracks eliminates annual inspections and allows the fire damper to be placed in concealed or inaccessible locations without the need for access or fire rated access doors. This invention also has applications for exterior hood penetrations in fire rated walls where access for conventional spring loaded dampers are not practical such as high rise construction or any elevated location or shaft.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A passive ductwork intumescent fire damper comprising a housing having a first end and a second end and constructed and arranged to be connected to an air duct, a meltable inner liner enclosed inside said housing, and an intumescent laminate assembly comprising a plurality of strips arranged in a longitudinal direction with respect to said housing surrounding said meltable inner liner, wherein when said passive ductwork intumescent fire damper is subjected to heat, said meltable inner liner melts exposing said intumescent laminate assembly adapted to close off said passive ductwork intumescent fire damper.

2. The passive ductwork intumescent fire damper according to claim 1 wherein said meltable inner liner comprises a plastic liner.

3. The passive ductwork intumescent fire damper according to claim 2 wherein said plurality of strips comprises metal on an inner surface of said strips and an intumescent material overlying said metal.

4. The passive ductwork intumescent fire damper according to claim 3 wherein said metal on the inner surface of said strips is copper.

5. The passive ductwork intumescent fire damper according to claim 1 wherein said housing is metal.

6. The passive ductwork intumescent fire damper according to claim 1 further comprising at least one heat shrink band surrounding said intumescent laminate assembly.

7. The passive ductwork intumescent fire damper according to claim 6 further comprising at least one intumescent band surrounding a bottom portion of the intumescent laminate assembly.

8. The passive ductwork intumescent fire damper according to claim 7 further comprising a plurality of support clips to attach said at least one heat shrink band and said at least one intumescent band.

* * * * *